(12) United States Patent
Saiki et al.

(10) Patent No.: US 12,304,134 B2
(45) Date of Patent: May 20, 2025

(54) METHOD FOR MANUFACTURING CONNECTOR-INTEGRATED RESIN TUBE

(71) Applicant: Sumitomo Riko Company Limited, Aichi (JP)

(72) Inventors: Kazuhiro Saiki, Aichi (JP); Koji Mizutani, Aichi (JP); Yorihiro Takimoto, Aichi (JP)

(73) Assignee: Sumitomo Riko Company Limited, Aichi (JP)

(*) Notice: Subject to any disclaimer, the term of this patent is extended or adjusted under 35 U.S.C. 154(b) by 255 days.

(21) Appl. No.: 18/165,342

(22) Filed: Feb. 7, 2023

(65) Prior Publication Data

US 2023/0202093 A1 Jun. 29, 2023

Related U.S. Application Data

(63) Continuation of application No. PCT/JP2022/017139, filed on Apr. 6, 2022.

(30) Foreign Application Priority Data

Apr. 19, 2021 (JP) ................... 2021-070634

(51) Int. Cl.
*B29C 53/00* (2006.01)
*B29C 53/08* (2006.01)
(Continued)

(52) U.S. Cl.
CPC .............. *B29C 53/08* (2013.01); *B29C 53/84* (2013.01); *B29C 65/1632* (2013.01); *B29C 2035/0283* (2013.01); *B29L 2023/004* (2013.01)

(58) Field of Classification Search
CPC ......... B29C 65/00; B29C 65/02; B29C 65/16; B29C 65/74; B29C 65/78; B29C 53/00; B29C 53/06; B29C 53/08; B29C 53/30
See application file for complete search history.

(56) References Cited

U.S. PATENT DOCUMENTS 4,804,019 A * 2/1989 Kramer, Jr. ........... B29C 53/305
 264/286
5,407,613 A * 4/1995 Schulte ................. B29C 53/083
 264/479

(Continued)

FOREIGN PATENT DOCUMENTS

DE 202005017314 12/2005
EP 1552916 7/2005
(Continued)

OTHER PUBLICATIONS

Office Action of Deutsches Counterpart Application, with English translation thereof, issued on Apr. 4, 2024, pp. 1-13.

*Primary Examiner* — Thu Khanh T. Nguyen
(74) *Attorney, Agent, or Firm* — JCIPRNET

(57) ABSTRACT

A method for manufacturing a connector-integrated resin tube includes: a fitting step in which an end portion of a resin tube material including a straight tube portion is fitted into an end portion of a connector of a tubular shape; a joining step in which the end portion of the resin tube material and the end portion of the connector that have been fitted are joined by laser welding; a heating holding step in which a posture holding die including a bending processing portion for bending processing of the straight tube portion is used to hold the straight tube portion in a heated and bent state at the bending processing portion of the posture holding die; and a cooling step in which the straight tube portion is cooled.

15 Claims, 9 Drawing Sheets

(51) Int. Cl.
  *B29C 53/84*   (2006.01)
  *B29C 65/16*   (2006.01)
  *B29C 35/02*   (2006.01)
  *B29L 23/00*   (2006.01)

(56) References Cited

U.S. PATENT DOCUMENTS

| | | | |
|---|---|---|---|
| 10,195,936 B2 | 2/2019 | Fukuyasu et al. | |
| 2004/0258789 A1 | 12/2004 | Phillips et al. | |
| 2005/0251986 A1 | 11/2005 | Katayama et al. | |
| 2017/0211727 A1* | 7/2017 | Peng | B29C 66/1224 |
| 2020/0368801 A1 | 11/2020 | Liu et al. | |

FOREIGN PATENT DOCUMENTS

| | | |
|---|---|---|
| JP | S52100585 | 8/1977 |
| JP | S5658833 | 5/1981 |
| JP | 2005193614 | 7/2005 |
| JP | 4161823 | 10/2008 |
| JP | 6710058 | 6/2020 |

\* cited by examiner

METHOD FOR MANUFACTURING CONNECTOR-INTEGRATED RESIN TUBE

CROSS-REFERENCE TO RELATED APPLICATION

This application is a continuation of PCT International Application No. PCT/JP2022/017139, filed on Apr. 6, 2022, which claims priority under 35 U.S.C. § 119(a) to Japanese Patent Application No. 2021-070634, filed on Apr. 19, 2021. Each of the above application(s) is hereby expressly incorporated by reference, in its entirety, into the present application.

BACKGROUND

Technical Field

The disclosure relates to a method for manufacturing a connector-integrated resin tube.

Related Art

It has been known to use a long tube (also called pipe) made of resin for, for example, a fuel supply passage or any other fluid circulation channel of an automobile. In order to connect the tube made of resin with another member, a connector for connection with another member is attached to an end portion of the tube made of resin.

For example, Japanese Patent No. 4161823 describes that a tube made of resin is inserted into a connector, followed by irradiation with a laser beam to join the tube made of resin to the connector by laser welding. As described in Japanese Patent No. 6710058, a resin tube is generally formed in a shape having a curved portion due to the layout.

In a method in which a curved portion is formed in a resin tube and then a connector is joined to an end portion of the resin tube by laser welding, an apparatus for laser welding is increased in size. For example, if laser welding is performed over the entire circumference of a target in a circumferential direction, a laser beam is irradiated while the welding target is rotated. Thus, the presence of the curved portion of the resin tube increases a rotation radius of the resin tube. Hence, the apparatus for laser welding is increased in size.

Furthermore, in the apparatus for laser welding, the resin tube needs to be supported when laser welding is performed. In order to support the resin tube having the curved portion, a support jig is disposed in a position in accordance with the curved shape of the resin tube. Thus, if the shape of the resin tube as the welding target is changed, a changeover of the support jig becomes necessary and a large number of man-hours is required.

SUMMARY

According to one aspect of the disclosure, a method for manufacturing a connector-integrated resin tube is provided, the connector-integrated resin tube including a curved portion. The method includes: a fitting step in which an end portion of a resin tube material including a straight tube portion is fitted into an end portion of a connector of a tubular shape; a joining step in which the end portion of the resin tube material and the end portion of the connector that have been fitted are joined by laser welding; a heating holding step in which a posture holding die including a bending processing portion for bending processing of the straight tube portion is used to hold the straight tube portion in a heated and bent state at the bending processing portion of the posture holding die; and a cooling step in which the straight tube portion is cooled.

DESCRIPTION OF THE EMBODIMENTS

Figure 1:
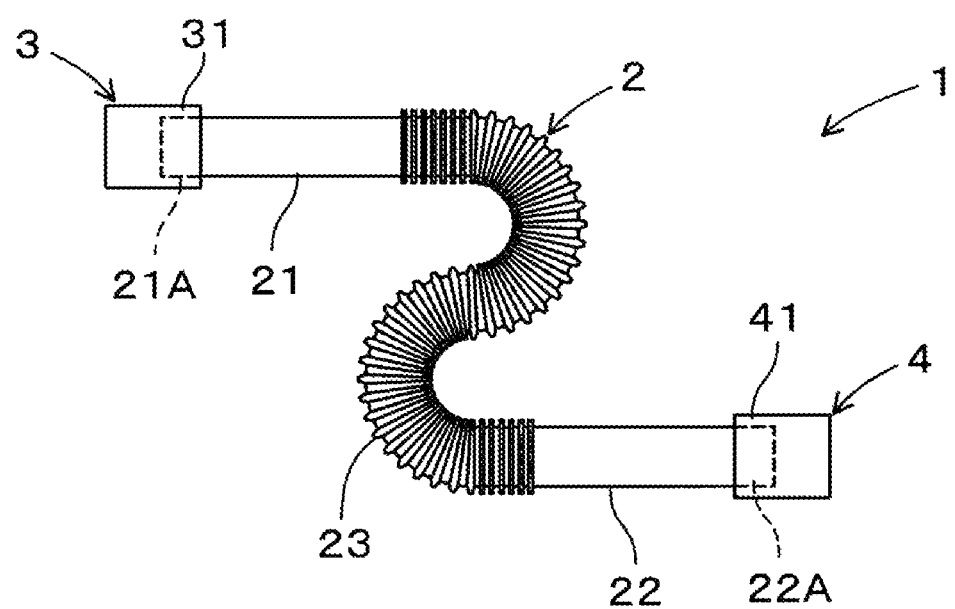
FIG. 1 is a diagram showing a final form of a connector-integrated resin tube being a target of a manufacturing method of a first embodiment.

The disclosure provides a method for manufacturing a connector-integrated resin tube, in which an apparatus for laser welding can be reduced in size and the occurrence of a changeover of a support jig in the apparatus for laser welding can be reduced.

According to one aspect of the disclosure, a method for manufacturing a connector-integrated resin tube is provided, the connector-integrated resin tube including a curved portion. The method includes: a fitting step in which an end portion of a resin tube material including a straight tube portion is fitted into an end portion of a connector of a tubular shape; a joining step in which the end portion of the resin tube material and the end portion of the connector that have been fitted are joined by laser welding; a heating holding step in which a posture holding die including a bending processing portion for bending processing of the straight tube portion is used to hold the straight tube portion in a heated and bent state at the bending processing portion of the posture holding die; and a cooling step in which the straight tube portion is cooled.

In the step of fitting the end portion of the resin tube material and the end portion of the connector of a tubular shape together, a state is achieved in which the resin tube material includes the straight tube portion. Furthermore, in the state in which the resin tube material includes the straight tube portion, the end portion of the resin tube material and the end portion of the connector are joined by laser welding. After that, in the heating holding step, the straight tube portion of the resin tube material is subjected to bending processing using the posture holding die.

That is, in the state in which the resin tube material includes the straight tube portion, the resin tube material and the connector are joined by laser welding, and bending processing with respect to the resin tube material is subsequently performed in the heating holding step. Thus, at the time of laser welding, the resin tube material is supported in a state before undergoing bending processing. That is, when laser welding is performed while a welding target is rotated, in a comparison between the resin tube material before undergoing bending processing and a final molded product that has undergone bending processing, the former has a much smaller rotation radius. Thus, by laser welding between the resin tube material before undergoing bending processing and the connector, an apparatus for laser welding can be reduced in size.

At the time of laser welding, the resin tube material in the state before undergoing bending processing is supported by a support jig in the apparatus for laser welding. It is possible to support the straight tube portion of the resin tube material by the support jig. Even in a type of connector-integrated resin tube in which portions of the resin tube constituting the connector-integrated resin tube as the final molded product are of different shapes, at the time of laser welding, the straight tube portion of each resin tube material before undergoing bending processing can be supported. Hence, a changeover of the support jig in the apparatus for laser welding may not have to be performed. Even if a changeover of the support jig is performed, the number of man-hours may be small. Thus, the number of man-hours required for a changeover of the support jig can be reduced.

As described above, the support jig supports the resin tube material in the state before undergoing bending processing. According to such a configuration, compared to a case where the support jig supports a portion of the resin tube that has undergone bending processing, in the apparatus for laser welding, the space for securing an installation position of the support jig can be reduced. Thus, the apparatus for laser welding can be reduced in size.

The reference numerals in parentheses in the claims indicate the correspondence with specific means described in the embodiments described later, and do not limit the technical scope of the disclosure.

1. First Embodiment 1-1. Configuration of Connector-Integrated Resin Tube 1

A connector-integrated resin tube 1 being a target of a manufacturing method of the present embodiment is described with reference to FIG. 1. The connector-integrated resin tube 1 may be applied in various fluid channels such as, for example, a fuel supply passage, a cooling water channel and a lubricating oil channel in an automobile. The connector-integrated resin tube 1 is formed in a long tubular shape as a whole, and has both ends connected to other members such as pipes or tubes. That is, the connector-integrated resin tube 1 allows a fluid to circulate therethrough between one mating member (not shown) connected to one end of the connector-integrated resin tube 1 and the other mating member (not shown) connected to the other end of the connector-integrated resin tube 1.

For example, in the case where the connector-integrated resin tube 1 is applied in a fuel supply passage, one end of the connector-integrated resin tube 1 is connected to a fuel delivery pipe connected to an injector of an engine, and the other end of the connector-integrated resin tube 1 is connected to a piping member or the like on a fuel tank side.

As shown in FIG. 1, the connector-integrated resin tube 1 includes a resin tube 2, a first connector 3, and a second connector 4. The connector-integrated resin tube 1 is configured as an integral body by joining the first connector 3 and the second connector 4 to the resin tube 2. In the present embodiment, an example is shown in which the connector-integrated resin tube 1 includes the first connector 3 and the second connector 4. However, the connector-integrated resin tube 1 may include only one connector, for example, the first connector 3.

The resin tube 2 is formed in a long tubular shape and includes a curved portion in at least one place. Depending on the environment in which the resin tube 2 is disposed, the number and angle of curved portions, and distance between adjacent curved portions or the like may be changed as appropriate. In FIG. 1, an example is shown in which the resin tube 2 has an S shape, that is, the resin tube 2 includes a curved portion of a U-turn shape in two places.

If the resin tube 2 circulates, for example, gasoline, the resin tube 2 has a multilayer structure in consideration of gasoline resistance, fuel permeation resistance, weather resistance or the like. That is, the resin tube 2 is made of a resin material corresponding to the fluid circulating therethrough. In the present embodiment, since the resin tube 2 is joined to the first connector 3 and the second connector 4 by laser welding, the resin tube 2 is molded of a material of a higher laser beam absorption rate than the first connector 3 and the second connector 4.

The resin tube 2 includes a first end tube portion 21, a second end tube portion 22, and an intermediate tube portion 23. The first end tube portion 21 constitutes a portion on one end side of the resin tube 2. In the present embodiment, the first end tube portion 21 is a portion formed in a straight tubular shape and is formed in a non-bellows-like tubular shape. However, the first end tube portion 21 may be formed in any shape such as a wavy shape, without being limited to a straight tubular shape, and may be formed in a bellows-like tubular shape, without being limited to a non-bellows-like tubular shape. An end portion 21A (hereinafter referred to as "first end portion") on an opening side of the first end tube portion 21 constitutes an end portion on a first opening side of the resin tube 2. Here, the term "straight tubular shape" means a tubular shape whose central axis is located on a straight line, and the same applies hereinafter.

The second end tube portion 22 constitutes a portion on the other end side of the resin tube 2. In the present embodiment, the second end tube portion 22 is a portion formed in a straight tubular shape and is formed in a non-bellows-like tubular shape. However, the second end tube portion 22 may be formed in any shape such as a wavy shape, without being limited to a straight tubular shape, and may be formed in a bellows-like tubular shape, without being limited to a non-bellows-like tubular shape. An end portion 22A (hereinafter referred to as "second end portion") on an opening side of the second end tube portion 22 constitutes an end portion on a second opening side of the resin tube 2.

The intermediate tube portion 23 constitutes an intermediate portion of the resin tube 2. That is, the intermediate tube portion 23 is a portion connecting the first end tube portion 21 with the second end tube portion 22. The intermediate tube portion 23 includes a curved portion. In the present embodiment, the intermediate tube portion 23 includes a curved portion of a U-turn shape in two places and is formed in an S shape. However, the intermediate tube portion 23 may include any curved portion. The intermediate tube portion 23 is formed in a bellows-like tubular shape. However, the intermediate tube portion 23 may be formed in a non-bellows-like tubular shape, without being limited to a bellows-like tubular shape.

The first connector 3 is formed of resin into a tubular shape. The first connector 3 is joined by laser welding to the first end portion 21A of the first end tube portion 21 on one end side of the resin tube 2. The first connector 3 has at least an end portion 31 of a tubular shape. The first end portion 21A of the first end tube portion 21 of the resin tube 2 is fitted into the end portion 31 of the first connector 3. Furthermore, the end portion 31 of the first connector 3 is joined to the first end portion 21A of the first end tube portion 21.

In the present embodiment, the first end portion 21A of the first end tube portion 21 of the resin tube 2 is inserted radially inside the end portion 31 of the first connector 3. An inner peripheral surface of the end portion 31 of the first connector 3 and an outer peripheral surface of the first end portion 21A of the first end tube portion 21 are joined by laser welding. However, the first end portion 21A of the first end tube portion 21 of the resin tube 2 may be fitted radially outside the end portion 31 of the first connector 3. In this case, an outer peripheral surface of the end portion 31 of the first connector 3 and an inner peripheral surface of the first end portion 21A of the first end tube portion 21 are joined by laser welding.

At least the end portion 31 of the first connector 3 is molded of a resin material having a lower laser beam absorption rate than the resin tube 2. The entire first connector 3 may be molded of a resin material having a lower laser beam absorption rate than the resin tube 2.

Examples of a base resin of the first connector 3 may include polypropylene, polyamide, polyphenylene sulfide, polyethylene terephthalate, polyethylene naphthalate, polybutylene terephthalate, polybutylene naphthalate, polymethylpentene, polyethylene, polyacetal, and fluorine resin. As polypropylene, for example, one having a refractive index of 1.47 to 1.51 may be used. As polyamide, for example, one having a refractive index of 1.51 to 1.55 may be used.

The first connector 3 may contain a reinforcing filler if strength is required. Examples of the reinforcing filler may include glass fiber, carbon fiber, potassium titanate, glass beads, milled fiber, and talc.

The first connector 3 may be composed of one part or component, or may be composed of a plurality of parts or components and be connected to each other. For example, if the first connector 3 is a known quick connector, it is composed of a plurality of parts or components.

The second connector 4 is formed of resin into a tubular shape. The second connector 4 is joined by laser welding to the second end portion 22A of the second end tube portion 22 on the other end side of the resin tube 2. The second connector 4 has at least an end portion 41 of a tubular shape. The second end portion 22A of the second end tube portion 22 of the resin tube 2 is fitted into the end portion 41 of the second connector 4. Furthermore, the end portion 41 of the second connector 4 is joined to the second end portion 22A of the second end tube portion 22.

In the present embodiment, the second end portion 22A of the second end tube portion 22 of the resin tube 2 is inserted radially inside the end portion 41 of the second connector 4. An inner peripheral surface of the end portion 41 of the second connector 4 and an outer peripheral surface of the second end portion 22A of the second end tube portion 22 are joined by laser welding. However, the second end portion 22A of the second end tube portion 22 of the resin tube 2 may be fitted radially outside the end portion 41 of the second connector 4. In this case, an outer peripheral surface of the end portion 41 of the second connector 4 and an inner peripheral surface of the second end portion 22A of the second end tube portion 22 are joined by laser welding.

At least the end portion 41 of the second connector 4 is molded of a resin material having a lower laser beam absorption rate than the resin tube 2. The entire second connector 4 may be molded of a resin material having a lower laser beam absorption rate than the resin tube 2. The second connector 4 may be molded of, for example, the same resin material as that of the first connector 3. The second connector 4 may be molded of a resin material different from that of the first connector 3. Like the first connector 3, the second connector 4 may be composed of one part or component, or may be composed of a plurality of parts or components and be connected to each other.

1-2. Method for Manufacturing Connector-Integrated Resin Tube 1

Figure 2:
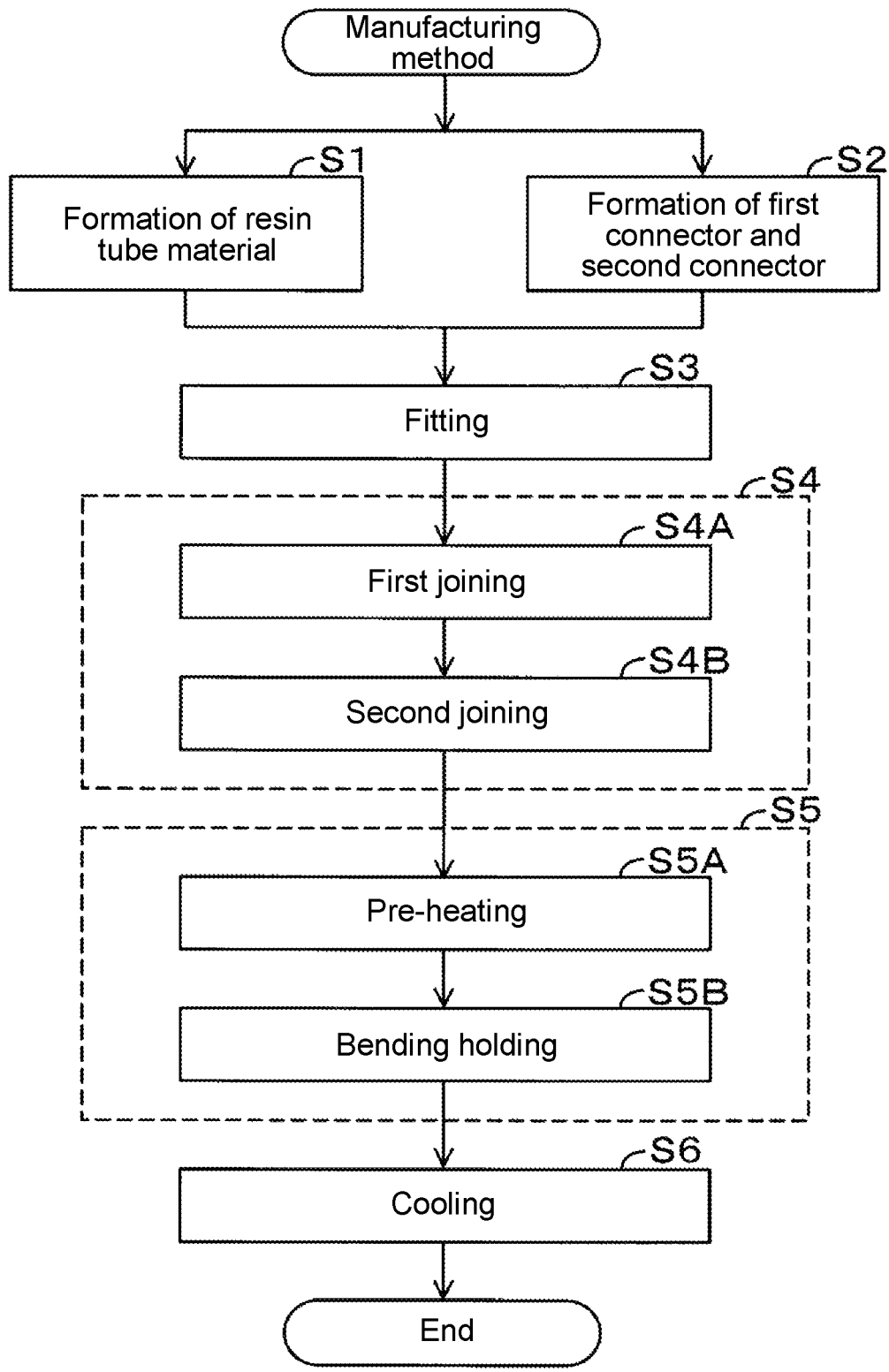
FIG. 2 is a flowchart showing the manufacturing method of the first embodiment.

A method for manufacturing the connector-integrated resin tube 1 is described with reference to FIG. 2 to FIG. 7. As shown in FIG. 2 and (A) of FIG. 3, a resin tube material 5 is formed (S1: resin tube material forming step). The resin tube material 5 is molded, for example, by extrusion molding. Since the resin tube material 5 in the present embodiment includes a bellows tube portion as described later, the resin tube material 5 is molded by extrusion molding and corrugation molding. For example, extrusion suction molding or extrusion blow molding may be applied. The resin tube material 5 may have a tubular shape with no bellows tube portion, that is, the resin tube material 5 may be composed of a non-bellows tube portion over its entire length.

Unlike the resin tube 2 shown in FIG. 1, the resin tube material 5 has a shape in which an intermediate tube portion 24 has not undergone bending processing. For example, as shown in (A) of FIG. 3, the resin tube material 5 is composed of a straight tube portion (a tube portion of a straight tubular shape) over its entire length. In this case, the first end tube portion 21, the second end tube portion 22 and the intermediate tube portion 24 constituting the resin tube material 5 are all formed in the shape of straight tubes having the same axis. Here, for convenience, portions of a straight tubular shape in the resin tube material 5, that is, the first end tube portion 21, the second end tube portion 22 and the intermediate tube portion 24, are referred to as the straight tube portion (21, 22, 24). The resin tube material 5 is preferably composed of a straight tube portion over its entire length, but may include a slightly curved portion.

The first end tube portion 21 and the second end tube portion 22 are the same as the first end tube portion 21 and the second end tube portion 22 constituting the connector-integrated resin tube 1 in the final form shown in FIG. 1. The intermediate tube portion 24 corresponds to a portion obtained by changing the intermediate tube portion 23 constituting the connector-integrated resin tube 1 in the final form shown in FIG. 1 into a straight tubular shape. That is, the intermediate tube portion 24 is a bellows tube portion of a straight tubular shape. The intermediate tube portion 24 is located on the same axis as the first end tube portion 21 and the second end tube portion 22.

Thus, the resin tube material 5 includes the first end tube portion 21 being a non-bellows tube portion, the second end tube portion 22 being a non-bellows tube portion, and the intermediate tube portion 24 being a bellows tube portion, and all these components are located on the same axis.

As shown in FIG. 2, in the method for manufacturing the connector-integrated resin tube 1, the first connector 3 and the second connector 4 are formed (S2: connector forming step). The first connector 3 and the second connector 4 are molded, for example, by injection molding. Of course, the first connector 3 and the second connector 4 may be molded by any method without being limited to injection molding.

Subsequently, as shown in FIG. 2 and (A) and (B) of FIG. 3, the first end portion (that is, the first end portion 21A of the first end tube portion 21) of the resin tube material 5 composed of the straight tube portion (21, 22, 24) over its entire length is fitted into the end portion 31 of the first connector 3 of a tubular shape (S3: fitting step). In the fitting step S3 of the present embodiment, the first end portion 21A of the resin tube material 5 is inserted radially inside the end portion 31 of the first connector 3. At this time, the first end portion 21A of the resin tube material 5 is preferably press-fitted into the end portion 31 of the first connector 3 while being reduced in diameter. Accordingly, the outer peripheral surface of the first end portion 21A of the resin tube material 5 and the inner peripheral surface of the end portion 31 of the first connector 3 are brought into close contact with each other.

Figure 4:
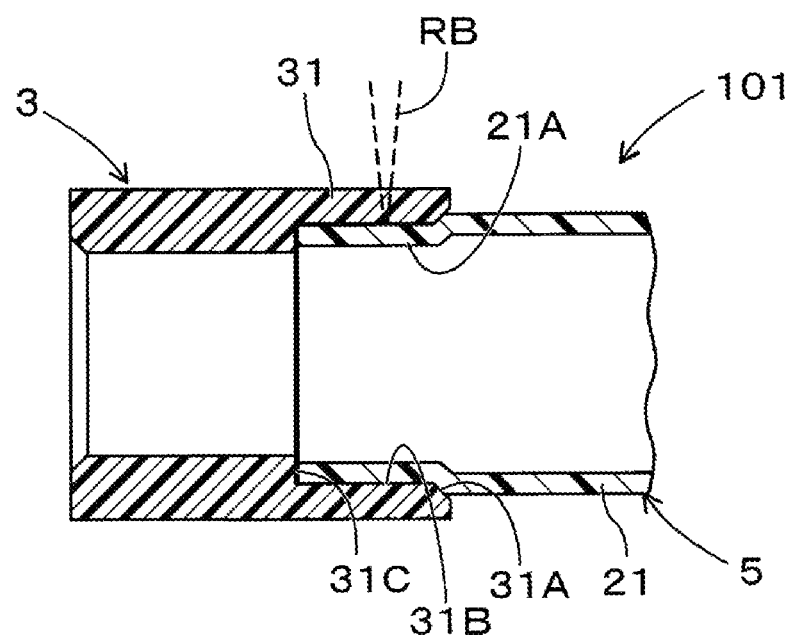
FIG. 4 is an enlarged sectional view of a portion A of FIG. 3.

A fitting portion between the first end portion 21A of the resin tube material 5 and the end portion 31 of the first connector 3 is described in detail with reference to FIG. 4. As shown in FIG. 4, the end portion 31 of the first connector 3 includes a guide 31A formed in a tapered shape on the inner peripheral surface at an opening end (right end in FIG. 4) of the end portion 31 of the first connector 3.

A maximum inner diameter of the tapered shape of the guide 31A is about the same as or slightly greater than an outer diameter of the first end portion 21A of the resin tube material 5 before reduction in diameter and deformation. A minimum inner diameter of the tapered shape of the guide 31A is smaller than the outer diameter of the first end portion 21A of the resin tube material 5 before reduction in diameter and deformation. Thus, when the resin tube material 5 is inserted inside the first end portion 31 of the first connector 3, the guide 31A abuts against the outer peripheral surface of the resin tube material 5. The guide 31A guides the reduction in diameter of the resin tube material 5.

Furthermore, the first end portion 31 of the first connector 3 includes a cylindrical inner peripheral surface portion 31B formed adjacent to the guide 31A on the inner peripheral surface and formed in the shape of a cylindrical inner peripheral surface. An inner diameter of the cylindrical inner peripheral surface portion 31B of the first end portion 31 of the first connector 3 matches the minimum inner diameter of the guide 31A. That is, the inner diameter of the cylindrical inner peripheral surface portion 31B is smaller than the outer diameter of the first end portion 21A of the resin tube material 5 before reduction in diameter and deformation. Thus, the first end portion 21A of the resin tube material 5 is inserted radially inside the cylindrical inner peripheral surface portion 31B with its diameter reduced. That is, the cylindrical inner peripheral surface portion 31B is brought into close contact with the outer peripheral surface of the first end portion 21A of the resin tube material 5 that has been reduced in diameter.

Furthermore, the first end portion 31 of the first connector 3 has a positioning end face 31C whose normal coincides with an opening side of the first end portion 31 (right side in FIG. 4). The positioning end face 31C positions the resin tube material 5 by abutting against a tip surface of the first end portion 21A of the resin tube material 5. In this way, the first end portion 21A of the resin tube material 5 is fitted into the end portion 31 of the first connector 3.

The first end portion 21A of the resin tube material 5 may be fitted radially outside the end portion 31 of the first connector 3. In this case, the first end portion 21A of the resin tube material 5 is preferably press-fitted into the end portion 31 of the first connector 3 while being expanded in diameter. Accordingly, the inner peripheral surface of the first end portion 21A of the resin tube material 5 and the outer peripheral surface of the end portion 31 of the first connector 3 are brought into close contact with each other.

Similarly, a second end portion (that is, the second end portion 22A of the second end tube portion 22) of the resin tube material 5 is fitted into the end portion 41 of the second connector 4 of a tubular shape (S3: fitting step). In the fitting step S3 of the present embodiment, the second end portion 22A of the resin tube material 5 is inserted radially inside the end portion 41 of the second connector 4. At this time, the second end portion 22A of the resin tube material 5 is preferably press-fitted into the end portion 41 of the second connector 4 while being reduced in diameter. Accordingly, the outer peripheral surface of the second end portion 22A of the resin tube material 5 and the inner peripheral surface of the end portion 41 of the second connector 4 are brought into close contact with each other. Here, the end portion 41 of the second connector 4 is preferably formed similarly to the end portion 31 of the first connector 3.

The second end portion 22A of the resin tube material 5 may be fitted radially outside the end portion 41 of the second connector 4. In this case, the second end portion 22A of the resin tube material 5 is preferably press-fitted into the end portion 41 of the second connector 4 while being expanded in diameter. Accordingly, the inner peripheral surface of the second end portion 22A of the resin tube material 5 and the outer peripheral surface of the end portion 41 of the second connector 4 are brought into close contact with each other.

Figure 3:
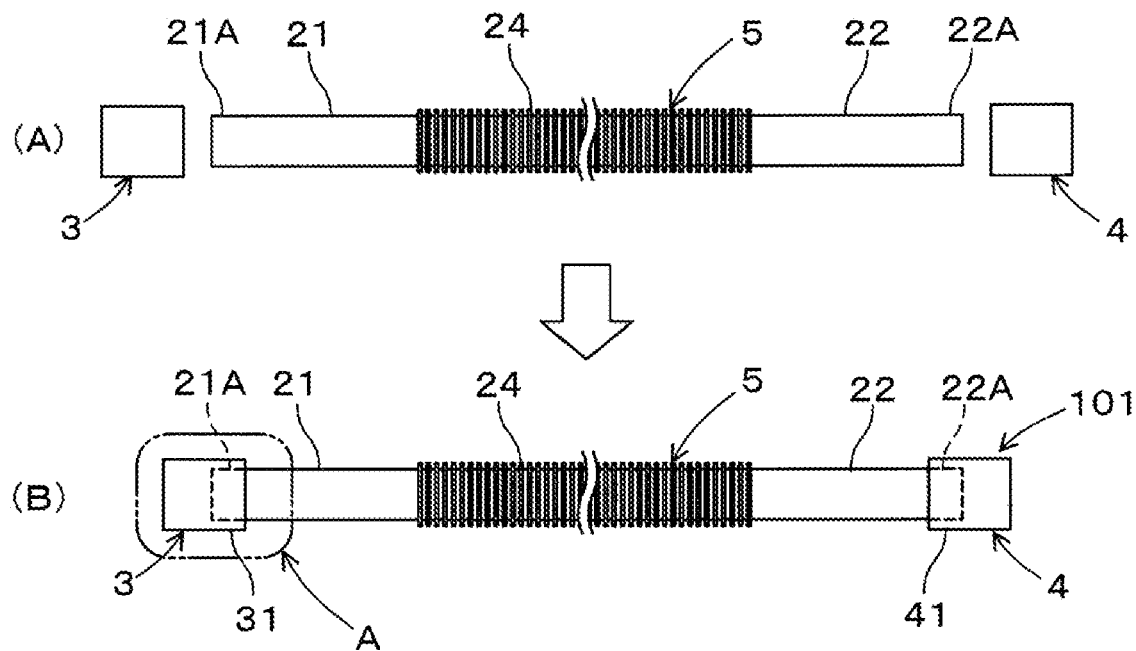
FIG. 3 is a diagram showing a fitting step of FIG. 2.

As shown in (B) of FIG. 3, by the fitting step S3, a primary molded body 101 of a connector-integrated resin tube is formed in which the first connector 3 and the second connector 4 are fitted into the resin tube material 5. In the primary molded body 101, the resin tube material 5 and the first connector 3 as well as the resin tube material 5 and the second connector 4 are separately integrated by fitting.

Subsequently, as shown in FIG. 2, the resin tube material 5 and each of the first connector 3 and the second connector 4, which have been fitted, are joined by laser welding, and a secondary molded body 201 of a connector-integrated resin tube is formed (S4: joining step).

Figure 5:
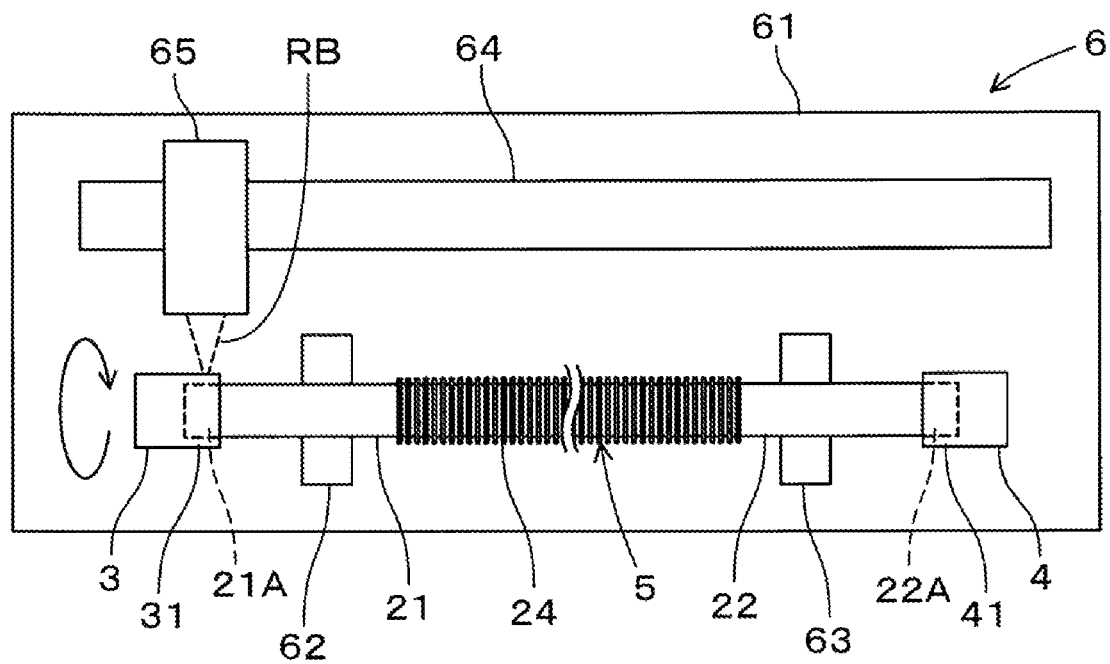
FIG. 5 is a plan view of an apparatus used in a first joining step of FIG. 2.

Here, an example of an apparatus 6 for laser welding is described with reference to FIG. 5. The apparatus 6 includes, for example, a base 61, a plurality of support jigs 62 and 63, a guide rail 64, a laser beam irradiation device 65, and a rotation drive device (not shown). The plurality of support jigs 62 and 63 are installed on the base 61, and their installation positions may be changed. For example, the plurality of support jigs 62 and 63 may be provided on the base 61 so that their distance relative to each other can be varied.

The plurality of support jigs 62 and 63 support the primary molded body 101 fitted in the fitting step S3. For example, the plurality of support jigs 62 and 63 may support a portion of the resin tube material 5 constituting the primary molded body 101. However, the plurality of support jigs 62 and 63 may also support a portion of the first connector 3 and the second connector 4 constituting the primary molded body 101. Furthermore, the plurality of support jigs 62 and 63 rotatably support the primary molded body 101.

The rotation drive device (not shown) rotationally drives the primary molded body 101 supported by the plurality of support jigs 62 and 63. The rotation drive device may be configured in the support jigs 62 and 63 or may be provided as a component separate from the support jigs 62 and 63.

Here, the rotation drive device rotates the primary molded body 101 about a central axis of the primary molded body 101. That is, a rotation radius of the primary molded body 101 is equal to a radius of a portion having a maximum outer diameter out of the resin tube material 5, the first connector 3 and the second connector 4 constituting the primary molded body 101.

The guide rail 64 is provided in a distant position in a direction orthogonal to a direction (left-right direction in FIG. 5) in which the plurality of support jigs 62 and 63 are arranged, so as to extend in a direction parallel to the direction (left-right direction in FIG. 5) in which the plurality of support jigs 62 and 63 are arranged.

The laser beam irradiation device 65 is provided movably along the guide rail 64 and is a device for irradiating a laser beam RB for laser welding. It suffices if the apparatus 6 is able to relatively move the primary molded body 101 and the laser beam irradiation device 65 in a direction of the central axis of the primary molded body 101. For example, the apparatus 6 may be configured to be able to move the support jigs 62 and 63 that support the primary molded body 101 along a guide rail. In this case, the primary molded body 101 may move with respect to the base 61.

In the present embodiment, the joining step S4 includes a first joining step S4A in which the first end portion 21A of the resin tube material 5 and the end portion 31 of the first connector 3 are joined, and a second joining step S4B subsequent to the first joining step S4A, in which the second end portion 22A of the resin tube material 5 and the end portion 41 of the second connector 4 are joined.

The first joining step S4A is described with reference to FIG. 4 and FIG. 5. First, the primary molded body 101 is brought into a state of being supported by the plurality of supporting jigs 62 and 63. In particular, the plurality of support jigs 62 and 63 are configured to support the straight tube portion (21, 22, 24) of the resin tube material 5 of the primary molded body 101. Then, the laser beam irradiation device 65 is positioned at a position facing the fitting portion between the first end portion 21A of the resin tube material 5 and the end portion 31 of the first connector 3 in the primary molded body 101. Subsequently, while the primary molded body 101 is rotated about the central axis of the primary molded body 101 by the rotation drive device, the laser beam RB is irradiated by the laser beam irradiation device 65.

Then, the laser beam irradiation device 65 irradiates the laser beam RB toward the outer peripheral surface of the end portion 31 of the first connector 3. The irradiated end portion 31 of the first connector 3 is molded by passing the laser beam RB through a resin material having a high laser transmittance. Thus, the laser beam RB is transmitted through the end portion 31 of the first connector 3 and reaches a contact surface between the end portion 31 of the first connector 3 and the first end portion 21A of the resin tube material 5. In FIG. 4, the laser beam RB reaches the cylindrical inner peripheral surface portion 31B of the end portion 31 of the first connector 3. At the first end portion 21A of the resin tube material 5, the laser beam RB is absorbed and heat is generated.

Then, the end portion 31 of the first connector 3 and the first end portion 21A of the resin tube material 5 are joined by laser welding. The laser beam RB is irradiated around the entire outer peripheral surface of the end portion 31 of the first connector 3. Thus, the end portion 31 of the first connector 3 and the first end portion 21A of the resin tube material 5 are joined by laser welding over the entire circumference.

Figure 6:
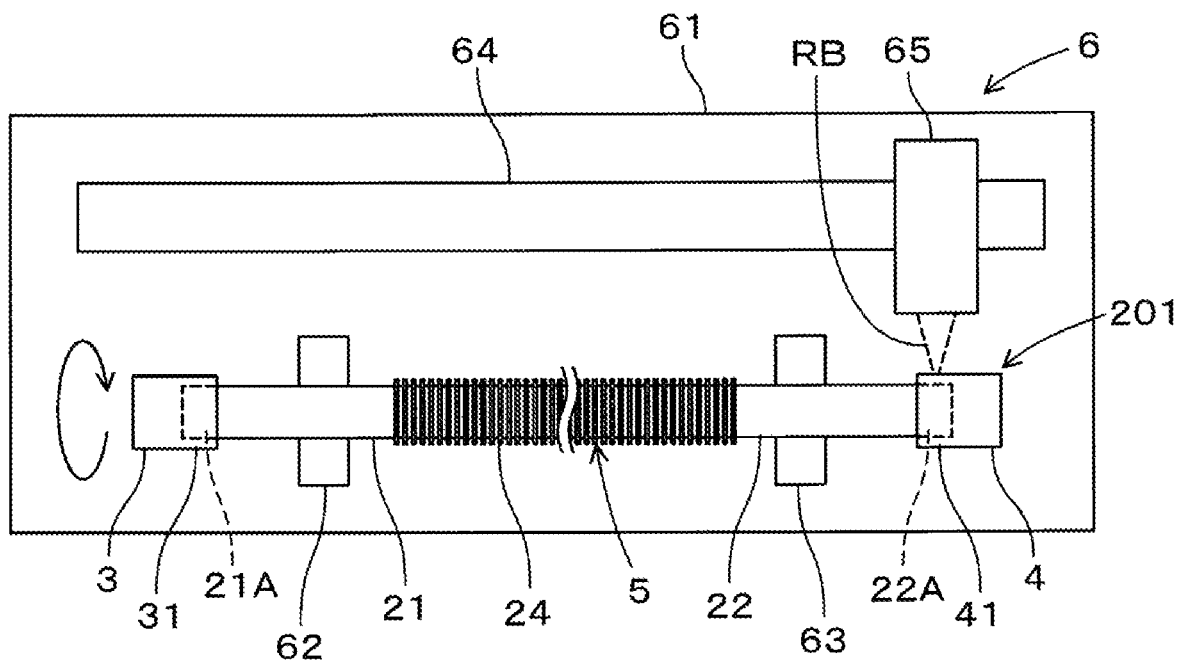
FIG. 6 is a plan view of an apparatus used in a second joining step of FIG. 2.

Next, the second joining step S4B is described with reference to FIG. 6. With respect to the primary molded body 101, after the end portion 31 of the first connector 3 and the first end portion 21A of the resin tube material 5 are joined, the end portion 41 of the second connector 4 and the second end portion 22A of the resin tube material 5 are then joined.

First, the primary molded body 101 maintains being supported by the plurality of supporting jigs 62 and 63. Then, the laser beam irradiation device 65 is positioned at a position facing the fitting portion between the second end portion 22A of the resin tube material 5 and the end portion 41 of the second connector 4 in the primary molded body 101. Subsequently, while the primary molded body 101 is rotated about the central axis of the primary molded body 101 by the rotation drive device, the laser beam RB is irradiated by the laser beam irradiation device 65.

Then, the laser beam irradiation device 65 irradiates the laser beam RB toward the outer peripheral surface of the end portion 41 of the second connector 4. The irradiated end portion 41 of the second connector 4 is molded by passing the laser beam RB through a resin material having a high laser transmittance. Thus, the laser beam RB is transmitted through the end portion 41 of the second connector 4 and reaches a contact surface between the end portion 41 of the second connector 4 and the second end portion 22A of the resin tube material 5. At the second end portion 22A of the resin tube material 5, the laser beam RB is absorbed and heat is generated.

Then, the end portion 41 of the second connector 4 and the second end portion 22A of the resin tube material 5 are joined by laser welding. The laser beam RB is irradiated around the entire outer peripheral surface of the end portion 41 of the second connector 4. Thus, the end portion 41 of the second connector 4 and the second end portion 22A of the resin tube material 5 are joined by laser welding over the entire circumference. In this way, a secondary molded body 201 is formed in which the first connector 3 and the second connector 4 are joined to the resin tube material 5. The secondary molded body 201 has a straight tubular shape.

Subsequently, as shown in FIG. 2, at least a portion of the straight tube portion (21, 22, 24) of the resin tube material 5 constituting the secondary molded body 201 is held in a heated and bent state using the posture holding die 7 for bending processing of a portion of the straight tube portion (21, 22, 24) of the resin tube material 5 (S5: heating holding step).

Figure 7:
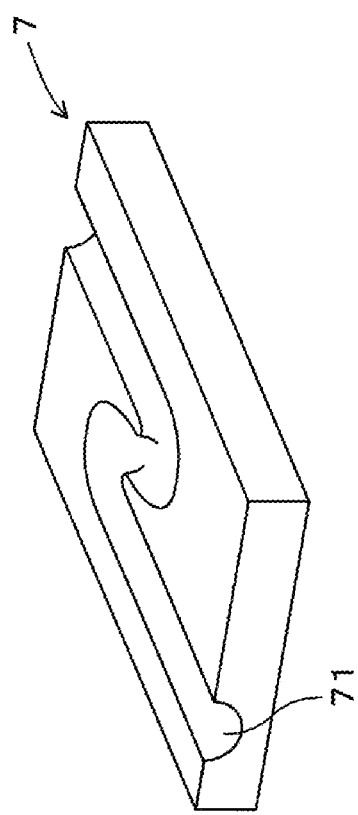
FIG. 7 is a perspective view showing a posture holding die used in a heating holding step of FIG. 2.

The posture holding die 7 is described with reference to FIG. 7. The posture holding die 7 includes a bending processing portion 71 for bending processing of a portion of the straight tube portion (21, 22, 24) of the resin tube material 5 of the secondary molded body 201. In the present embodiment, the bending processing portion 71 is a groove into which the secondary molded body 201 can be fitted in order to retain the shape of the secondary molded body 201. The groove as the bending processing portion 71 is formed so that the secondary molded body 201 can be fitted therein with its entire length. However, the groove as the bending processing portion 71 may be formed only in a portion of the secondary molded body 201, in particular a portion that performs bending processing. It suffices if the posture holding die 7 is able to hold the posture of the secondary molded body 201 in a bent state, and the bending processing portion 71 can be formed in not only a groove shape but also any other shape. The type of the posture holding die 7 (bending die) is not limited to that of the present embodiment, and a posture holding die of any shape or material may be applied.

In the present embodiment, the intermediate tube portion 24 out of the straight tube portion (21, 22, 24) of the resin tube material 5 is subjected to bending processing. That is, the intermediate tube portion 24 being a bellows tube portion is a target portion of bending processing. Thus, it suffices if the bending processing portion 71 of the posture holding die 7 is able to hold the intermediate tube portion 24 being a bellows tube portion of the resin tube material 5 in a bent state.

Furthermore, the first end tube portion 21 and the second end tube portion 22 out of the straight tube portion (21, 22, 24) of the resin tube material 5 may maintain being a straight tube. Therefore, the bending processing portion 71 of the posture holding die 7 holds the entire length of the secondary molded body 201, and a portion of the bending processing portion 71 holds the first end tube portion 21 and the second end tube portion 22 being non-bellows tube portions in the state of being a straight tube.

In the present embodiment, the heating holding step S5 includes a pre-heating step S5A and a bending holding step S5B. In the pre-heating step S5A, at least the intermediate tube portion 24 out of the straight tube portion (21, 22, 24) of the resin tube material 5, which is to undergo bending processing, is heated. However, in the present embodiment, in the pre-heating step S5A, heating is performed over the entire length of the resin tube material 5, that is, the entire length of the straight tube portion (21, 22, 24).

In the bending holding step S5B, at least the intermediate tube portion 24 out of the straight tube portion (21, 22, 24) of the resin tube material 5 is disposed in the bending processing portion 71 of the posture holding die 7, and the intermediate tube portion 24 out of the straight tube portion (21, 22, 24) of the resin tube material 5 is held in the bent state at the bending processing portion 71 of the posture holding die 7.

By heating the resin tube material 5 and holding the intermediate tube portion 24 of the resin tube material 5 in the bent state for a certain period of time, the intermediate tube portion 24 of the resin tube material 5 is subjected to bending processing, stress in a portion undergoing bending processing is relaxed by heating, and the portion undergoing bending processing becomes stable. Since the entire resin tube material 5 is heated, the stress in portions other than the portion undergoing bending processing is also relaxed, and the shape becomes stable.

Subsequently, as shown in FIG. 2, the secondary molded body 201 that has undergone heating and bending processing in the heating holding step S5 is cooled (S6: cooling step). Then, the connector-integrated resin tube 1 shown in FIG. 1 is formed. Here, the secondary molded body 201 may be cooled while being held by the posture holding die 7, or may be removed from the posture holding die 7 and be cooled.

1-3. Effects

In the fitting step S3 of fitting the end portions 21A and 22A of the resin tube material 5 into the end portion 31 of the connector 3 of a tubular shape and the end portion 41 of the connector 4 of a tubular shape, a state is achieved in which the resin tube material 5 includes the straight tube portion (21, 22, 24). Furthermore, in the state in which the resin tube material 5 includes the straight tube portion (21, 22, 24), the end portions 21A and 22A of the resin tube material 5 are joined to the end portion 31 of the connector 3 and the end portion 41 of the connector 4 by laser welding. After that, in the heating holding step S5, the intermediate tube portion 24 out of the straight tube portion (21, 22, 24) of the resin tube material 5 is subjected to bending processing using the posture holding die 7.

That is, in the state in which the resin tube material 5 includes the straight tube portion (21, 22, 24), the resin tube material 5 and the connectors 3 and 4 are joined by laser welding, and bending processing with respect to the resin tube material 5 is subsequently performed in the heating holding step S5. Thus, at the time of laser welding, the resin tube material 5 is supported in a state before undergoing bending processing. That is, when laser welding is performed while the primary molded body 101 being a welding target is rotated, in a comparison between the resin tube material 5 before undergoing bending processing and the connector-integrated resin tube 1 being a final molded product that has undergone bending processing, the former has a much smaller rotation radius. Thus, by laser welding between the resin tube material 5 before undergoing bending processing and the connectors 3 and 4, the apparatus 6 for laser welding can be reduced in size.

At the time of laser welding, the resin tube material 5 in the state before undergoing bending processing is supported by the support jigs 62 and 63 in the apparatus 6 for laser welding. It is possible to support the straight tube portion (21, 22, 24) of the resin tube material 5 by the support jigs 62 and 63. Even in a type of connector-integrated resin tube in which portions of the resin tube 2 constituting the connector-integrated resin tube 1 as the final molded product are of different shapes, at the time of laser welding, the straight tube portion (21, 22, 24) of each resin tube material 5 before undergoing bending processing can be supported. Hence, a changeover of the support jigs 62 and 63 in the apparatus 6 for laser welding may not have to be performed. Even if a changeover of the support jigs 62 and 63 is performed, the number of man-hours may be small. Thus, the number of man-hours required for a changeover of the support jigs 62 and 63 can be reduced.

As described above, the support jigs 62 and 63 support the resin tube material 5 in the state before undergoing bending processing. According to such a configuration, compared to a case where the support jigs 62 and 63 support a portion of the resin tube 2 that has undergone bending processing, in the apparatus 6 for laser welding, the space for securing the installation positions of the support jigs 62 and 63 can be reduced. Thus, the apparatus 6 for laser welding can be reduced in size.

In the joining step S4, the first end portion 21A of the resin tube material 5 and the end portion 31 of the first connector 3 are joined by laser welding, and then the second end portion 22A of the resin tube material 5 and the end portion 41 of the second connector 4 are joined by laser welding. Then, the intermediate tube portion 24 of the resin tube material 5 undergoes bending processing in a post-process. Thus, when laser welding is performed continuously in two places, it suffices to relatively move the laser beam irradiation device 65 and the resin tube material 5 in a central axis direction of the resin tube material 5. In this way, even if one laser beam irradiation device 65 is used, it is possible to easily perform laser welding continuously in two places.

In particular, in the fitting step S3, the end portions 21A and 22A of the resin tube material 5 composed of the straight tube portion (21, 22, 24) over its entire length are fitted into the end portion 31 of the connector 3 and the end portion 41 of the connector 4. That is, in the joining step S4, the resin tube material 5 having a straight tubular shape over its entire length and the connectors 3 and 4 are laser-welded. Thus, when laser welding is performed while the primary molded body 101 being the welding target is rotated, the rotation radius is smallest. Thus, the apparatus 6 for laser welding can be reduced in size.

The resin tube material 5 includes the intermediate tube portion 24 being a bellows tube portion. Then, in the heating holding step S5, at the bending processing portion 71 of the posture holding die 7, the intermediate tube portion 24 out of the straight tube portion (21, 22, 24), which is a bellows tube portion, is held in the heated and bent state. Thus, the resin tube material 5 can be easily disposed in the posture holding die 7.

The straight tube portion (21, 22, 24) in the resin tube material 5 includes the first end tube portion 21 and the second end tube portion 22 being bellows tube portions and the intermediate tube portion 24 being a non-bellows tube portion. Then, in the heating holding step S5, at the bending processing portion 71 of the posture holding die 7, the intermediate tube portion 24 out of the straight tube portion (21, 22, 24), which is a bellows tube portion, is held in the heated and bent state. On the other hand, the first end tube portion 21 and the second end tube portion 22 being non-bellows tube portions are held in the state of being a straight tube. Thus, in not only the intermediate tube portion 24 that undergoes bending processing but also the first end tube portion 21 and the second end tube portion 22 that maintain the state of being a straight tube, stress is relaxed and a stable shape is achieved.

In the heating holding step S5, the bending holding step S5B is performed after the pre-heating step S5A. After the secondary molded body 201 is heated, the secondary molded body 201 is held in a bent state in the posture holding die 7. Since the secondary molded body 201 is heated, the secondary molded body 201 can be easily disposed into the posture holding die 7.

In the fitting step S3, the end portions 21A and 22A of the resin tube material 5 are inserted radially inside the end portion 31 of the connector 3 and the end portion 41 of the connector 4. Then, in the joining step S4, the laser beam RB is irradiated from radially outside the end portion 31 of the connector 3 and the end portion 41 of the connector 4 toward the outer peripheral surfaces of the end portion 31 of the connector 3 and the end portion 41 of the connector 4, and the end portions 21A and 22A of the resin tube material 5 are joined to the end portion 31 of the connector 3 and the end portion 41 of the connector 4 by laser welding by the laser beam RB transmitted through the end portion 31 of the connector 3 and the end portion 41 of the connector 4. Since it is possible to irradiate the laser beam RB from radially outside, the apparatus 6 for laser welding has a simple configuration. Furthermore, even if one laser beam irradiation device 65 is used, it is possible to easily perform laser welding continuously in two places.

In the joining step S4, the resin tube material 5 is supported at a plurality of places by the plurality of support jigs 62 and 63. In particular, the straight tube portion (21, 22, 24) of the resin tube material 5 is supported at a plurality of places by the plurality of support jigs 62 and 63. In this state, the end portions 21A and 22A of the resin tube material 5 and the end portion 31 of the connector 3 and the end portion 41 of the connector 4, which have been fitted, are joined by laser welding. In this way, the straight tube portion (21, 22, 24) of the resin tube material 5 is supported at a plurality of places by the support jigs 62 and 63. Even if the resin tube material 5 as the welding target is changed in length, the positions of the plurality of support jigs 62 and 63 do not need to be changed at all; or, even if the positions are to be changed, a slight change would suffice.

In particular, in the joining step S4, by irradiating the laser beam RB while rotating the resin tube material 5 and the connectors 3 and 4, the end portions 21A and 22A of the resin tube material 5 are joined to the end portion 31 of the connector 3 and the end portion 41 of the connector 4 by laser welding. Accordingly, the connectors 3 and 4 can be easily laser-welded over the entire circumference. Even if such a method is applied, the apparatus 6 for laser welding can be reduced in size.

In the present embodiment, in the joining step S4, by irradiating the laser beam RB while rotating the resin tube material 5 and the connectors 3 and 4, the end portions 21A and 22A of the resin tube material 5 are joined to the end portion 31 of the connector 3 and the end portion 41 of the connector 4 by laser welding. In addition, in the joining step S4, by irradiating the laser beam RB while rotating the laser beam irradiation device 65, the end portions 21A and 22A of the resin tube material 5 may be joined to the end portion 31 of the connector 3 and the end portion 41 of the connector 4 by laser welding.

2. Second Embodiment

Figure 8:
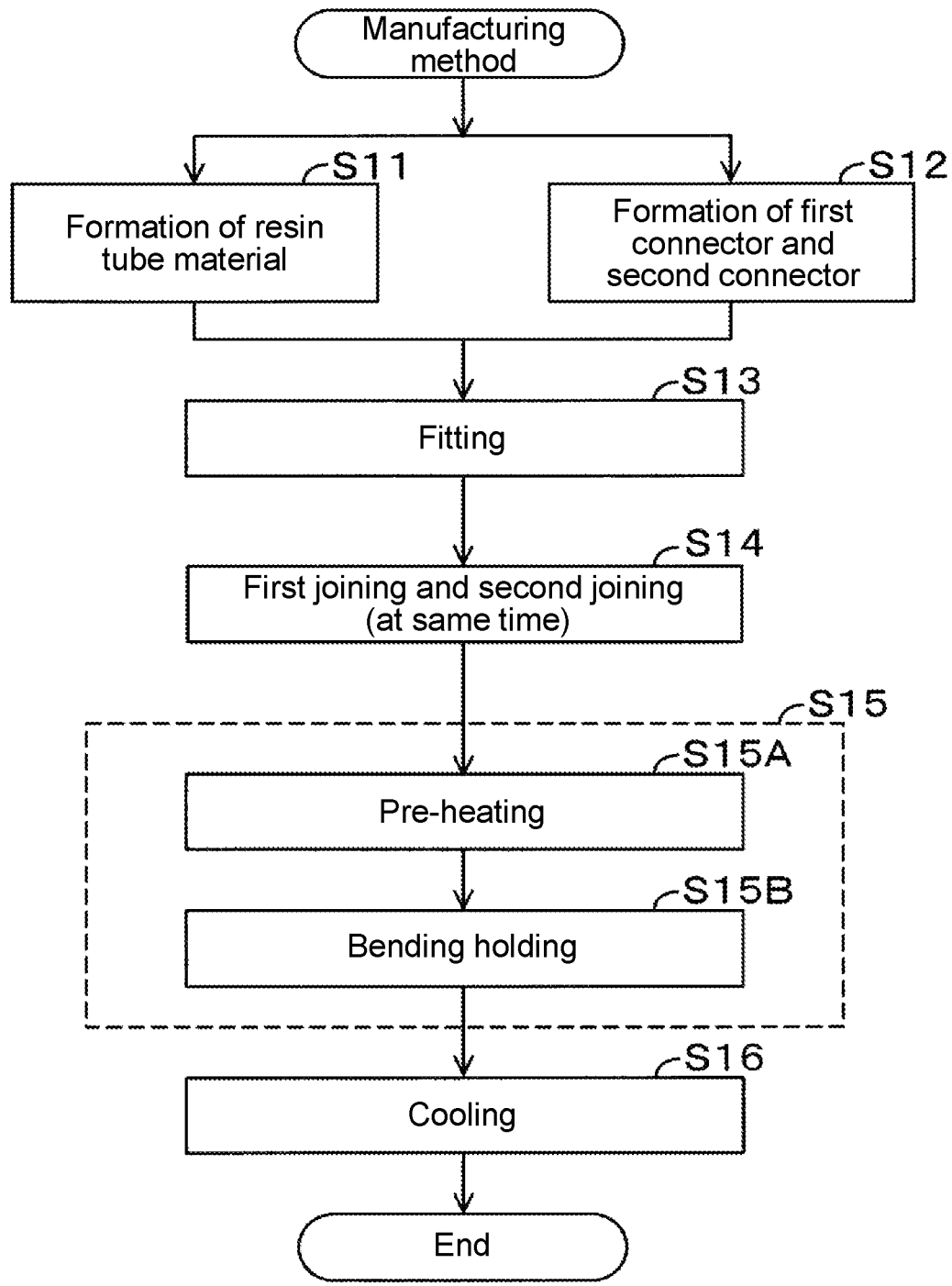
FIG. 8 is a flowchart showing a manufacturing method of a second embodiment.
Figure 9:
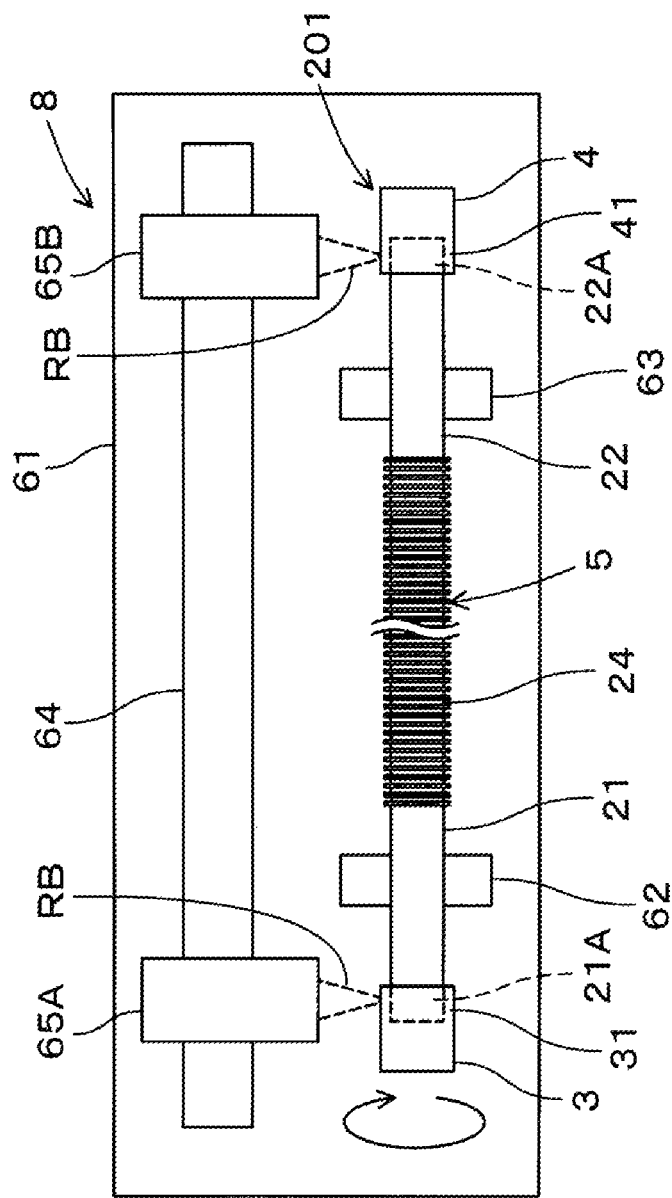
FIG. 9 is a plan view of an apparatus used in a joining step of FIG. 8.

A method for manufacturing the connector-integrated resin tube 1 of a second embodiment is described with reference to FIG. 8 and FIG. 9. As shown in FIG. 8, a forming step S11 of the resin tube material 5, a forming step S12 of the first connector 3 and the second connector 4, and a fitting step S13 are performed. S11, S12 and S13 are the same as S1, S2 and S3 in the first embodiment.

Subsequently, in a joining step S14, first joining and second joining are performed at the same time. That is, in the joining step S14, at the same time as the first end portion 21A of the resin tube material 5 and the end portion 31 of the first connector 3 are joined by laser welding, the second end portion 22A of the resin tube material 5 and the end portion 41 of the second connector 4 are joined by laser welding.

Here, an apparatus 8 for laser welding for realizing the joining step S14 is described with reference to FIG. 9. The apparatus 8 includes two laser beam irradiation devices 65A and 65B. One laser beam irradiation device 65A performs laser welding between the first end portion 21A of the resin tube material 5 and the end portion 31 of the first connector 3. The other laser beam irradiation device 65B performs laser welding between the second end portion 22A of the resin tube material 5 and the end portion 41 of the second connector 4. That is, by irradiating the laser beam RB at two places while rotating the primary molded body 101, the secondary molded body 201 is formed.

Subsequently, a heating holding step S15 is performed, and a cooling step S16 is performed. In the heating holding step S15, after a pre-heating step S15A, a bending holding step S15B is performed. S15, S15A, S15B and S16 are the same as S5, S5A, S5B and S6 in the first embodiment. In this way, the connector-integrated resin tube 1 is manufactured.

In the present embodiment, laser welding is performed in two places at the same time using the two laser beam irradiation devices 65A and 65B. This can be realized because laser welding is performed on the resin tube material 5 before undergoing bending processing. In particular, by forming the resin tube material 5 into a straight tubular shape over its entire length, the above can be relatively easily realized. As a result, the time required for laser welding can be shortened.

3. Third Embodiment

Figure 10:
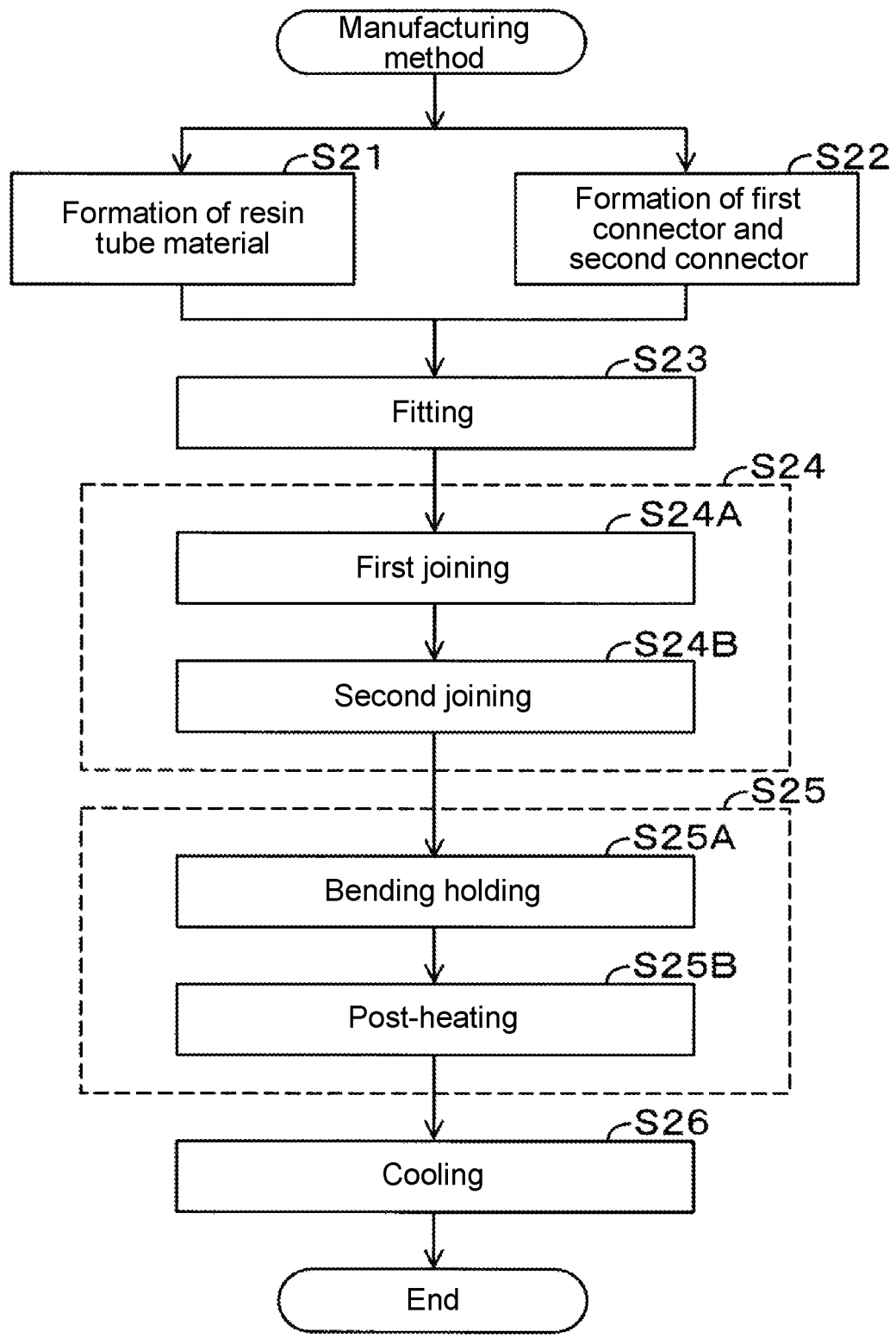
FIG. 10 is a flowchart showing a manufacturing method of a third embodiment.

A method for manufacturing the connector-integrated resin tube 1 of a third embodiment is described with reference to FIG. 10. As shown in FIG. 10, a forming step S21 of the resin tube material 5, a forming step S22 of the first connector 3 and the second connector 4, a fitting step S23, and a joining step S24 are performed. In the joining step S24, after a first joining step S24A, a second joining step S24B is performed. Here, S21, S22, S23, S24, S24A, and S24B are the same as S1, S2, S3, S4, S4A, and S4B in the first embodiment.

Subsequently, a heating holding step S25 is performed. In the heating holding step S25, after a bending holding step S25A, a post-heating step S25B is performed. In the bending holding step S25A, at least the intermediate tube portion 24 out of the straight tube portion (21, 22, 24) of the resin tube material 5 is disposed in the bending processing portion 71 of the posture holding die 7, and the intermediate tube portion 24 out of the straight tube portion (21, 22, 24) of the resin tube material 5 is held in a bent state at the bending processing portion 71 of the posture holding die 7.

Then, in the post-heating step S25B, the resin tube material 5 held by the posture holding die 7 is heated. That is, the intermediate tube portion 24 out of the straight tube portion (21, 22, 24) is heated in the bent state. At this time, portions other than the intermediate tube portion 24, that is, the first end tube portion 21 and the second end tube portion 22, are also heated.

Subsequently, the cooling step S26 is performed. S26 is the same as S6 in the first embodiment. In this way, the connector-integrated resin tube 1 is manufactured. In the present embodiment, the same effects as those of the first embodiment are achieved. The joining step S24 in the present embodiment may be replaced with the processing of the joining step S14 in the second embodiment. That is, in the joining step S24, first joining and second joining may be performed at the same time.

4. Fourth Embodiment

Figure 11:
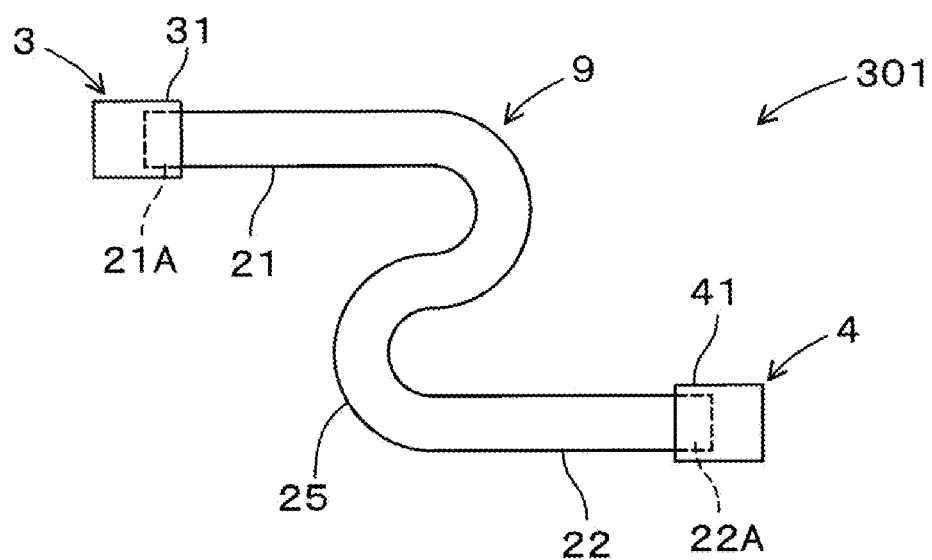
FIG. 11 is a diagram showing a final form of a connector-integrated resin tube being a target of a manufacturing method of a fourth embodiment.

A method for manufacturing a connector-integrated resin tube 301 of a fourth embodiment is described with reference to FIG. 11. FIG. 11 shows the connector-integrated resin tube 301 being a target of the manufacturing method of the present embodiment. The connector-integrated resin tube 301 is composed of a non-bellows tube portion over its entire length. That is, a resin tube 9 constituting the connector-integrated resin tube 301 includes the first end tube portion 21, the second end tube portion 22 and an intermediate tube portion 25. The first end tube portion 21 and the second end tube portion 22 are the same as in the first embodiment.

The intermediate tube portion 25 is composed of a non-bellows tube portion. The difference is that while the intermediate tube portion 23 in the first embodiment is a bellows tube portion, the intermediate tube portion 25 in the present embodiment is a non-bellows tube portion. Even if the intermediate tube portion 25 is a non-bellows tube portion, substantially the same effects as those of the first embodiment are achieved.

What is claimed is:

1. A method for manufacturing a connector-integrated resin tube (1, 301), the connector-integrated resin tube (1, 301) comprising a curved portion, the method comprising:
a fitting step (S3, S13, S23) in which an end portion (21A, 21B) of a resin tube material (5) including a straight tube portion (21, 22, 24) is fitted into an end portion (31, 41) of a connector (3, 4) of a tubular shape;
a joining step (S4, S14, S24) in which the end portion of the resin tube material and the end portion of the connector that have been fitted in the fitting step are joined by laser welding, after the fitting step;
a heating holding step (S5, S15, S25) in which a posture holding die (7) including a bending processing portion (71) for bending processing of the straight tube portion is used to hold the straight tube portion of the resin tube material to which the connector is joined in the joining step in a heated and bent state at the bending processing portion of the posture holding die, after the joining step; and
a cooling step (S6, S16, S26) in which the straight tube portion that has been heated and bent in the heating holding step is cooled, after the heating holding step.

2. The method for manufacturing a connector-integrated resin tube (1, 301) according to claim 1, wherein,
in the fitting step (S3, S23), a first end portion of the resin tube material is fitted into an end portion (31) of a first connector (3) being the connector, and a second end portion of the resin tube material is fitted into an end portion (41) of a second connector (4) being the connector; and
in the joining step (S4, S24), the first end portion of the resin tube material and the end portion of the first connector are joined by laser welding, and then the second end portion of the resin tube material and the end portion of the second connector are joined by laser welding.

3. The method for manufacturing a connector-integrated resin tube (1, 301) according to claim 1, wherein,
in the fitting step (S13), a first end portion (21A) of the resin tube material is fitted into an end portion (31) of a first connector (3) being the connector, and a second end portion (22A) of the resin tube material is fitted into an end portion (41) of a second connector (4) being the connector; and
in the joining step (S14), at a same time as the first end portion of the resin tube material and the end portion of the first connector are joined by laser welding, the second end portion of the resin tube material and the end portion of the second connector are joined by laser welding.

4. The method for manufacturing a connector-integrated resin tube (1, 301) according to claim 1, wherein,
in the fitting step (S3, S13, S23), the end portion of the resin tube material is fitted into the end portion of the connector, the resin tube material being composed of the straight tube portion over its entire length.

5. The method for manufacturing a connector-integrated resin tube (1) according to claim 1, wherein
the straight tube portion (21, 22, 24) includes a bellows tube portion (24) at least in part of the straight tube portion; and
in the heating holding step (S5, S15, S25), the bellows tube portion (24) of the straight tube portion is held in the heated and bent state at the bending processing portion of the posture holding die.

6. The method for manufacturing a connector-integrated resin tube (1) according to claim 5, wherein
the straight tube portion (21, 22, 24) includes the bellows tube portion (24) and a non-bellows tube portion (21, 22); and,
in the heating holding step (S5, S15, S25),
the bellows tube portion of the straight tube portion is held in the heated and bent state at the bending processing portion of the posture holding die; and
the non-bellows tube portion is held in a state of being a straight tube.

7. The method for manufacturing a connector-integrated resin tube (301) according to claim 1, wherein
the straight tube portion includes a non-bellows tube portion at least in part of the straight tube portion; and,
in the heating holding step (S5, S15, S25), the non-bellows tube portion of the straight tube portion is held in the heated and bent state at the bending processing portion of the posture holding die.

8. The method for manufacturing a connector-integrated resin tube (1, 301) according to claim 1, wherein
the heating holding step (S5, S15) includes:
a pre-heating step (S5A, S15A) in which the straight tube portion of the resin tube material is heated; and
a bending holding step (S5B, S15B) in which the straight tube portion of the resin tube material that has been heated in the pre-heating step is disposed in the bending processing portion of the posture holding die, and the straight tube portion of the resin tube material is held in a bent state at the bending processing portion of the posture holding die, after the pre-heating step.

9. The method for manufacturing a connector-integrated resin tube (1, 301) according to claim 1, wherein
the heating holding step (S25) includes:
a bending holding step (S25A) in which the straight tube portion of the resin tube material is disposed in the bending processing portion of the posture holding die, and the straight tube portion of the resin tube material is held in a bent state at the bending processing portion of the posture holding die; and
a post-heating step (S25B) in which the straight tube portion held in the bent state by the posture holding die in the bending holding step is heated, after the bending holding step.

10. The method for manufacturing a connector-integrated resin tube (1, 301) according to claim 1, wherein,
in the fitting step (S3, S13, S23), the end portion of the resin tube material is inserted radially inside the end portion of the connector.

11. The method for manufacturing a connector-integrated resin tube (1, 301) according to claim 10, wherein,
in the joining step (S4, S14, S24), a laser beam (RB) is irradiated from radially outside the end portion of the connector toward an outer peripheral surface of the end portion of the connector, and the end portion of the resin tube material and the end portion of the connector are joined by laser welding with the laser beam transmitted through the end portion of the connector.

12. The method for manufacturing a connector-integrated resin tube (1, 301) according to claim 1, wherein,
in the joining step (S4, S14, S24), the end portion of the resin tube material and the end portion of the connector that have been fitted are joined by laser welding while the resin tube material is supported at a plurality of places by a plurality of support jigs (62, 63).

13. The method for manufacturing a connector-integrated resin tube (1, 301) according to claim 12, wherein,
in the joining step (S4, S14, S24), the straight tube portion of the resin tube material is supported at a plurality of places by the plurality of support jigs.

14. The method for manufacturing a connector-integrated resin tube (1, 301) according to claim 1, wherein,
in the joining step (S4, S14, S24), the end portion of the resin tube material and the end portion of the connector are joined by laser welding by irradiating a laser beam while rotating the resin tube material and the connector.

15. The method for manufacturing a connector-integrated resin tube (1, 301) according to claim 1, wherein,
in the heating holding step (S5, S15, S25), an entirety of the resin tube material is heated.

* * * * *